(12) United States Patent
Desmaison

(10) Patent No.: US 6,352,305 B1
(45) Date of Patent: Mar. 5, 2002

(54) VEHICLE SEAT EQUIPPED WITH A DEVICE PROVIDING PROTECTION AGAINST IMPACTS FROM THE REAR

(75) Inventor: Jean-Luc Desmaison, Marlenheim (FR)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/133,645

(22) Filed: Aug. 13, 1998

(30) Foreign Application Priority Data

May 26, 1998 (FR) ............................................. 98 06701

(51) Int. Cl.⁷ ............................................. B60N 2/42
(52) U.S. Cl. ................................... 297/216.14; 297/480
(58) Field of Search ...................... 297/216.14, 216.13, 297/480, 477; 280/806

(56) References Cited

U.S. PATENT DOCUMENTS

| 3,901,100 A | 8/1975 | Iida et al. | |
| 4,836,608 A | 6/1989 | Sugiyama | |
| 5,460,429 A | 10/1995 | Whalen | |
| 5,697,670 A | * 12/1997 | Husted et al. | 297/216.13 |
| 5,839,790 A | * 11/1998 | Doty | 297/480 X |
| 5,984,357 A | * 11/1999 | Yasuda et al. | 297/480 X |
| 6,053,571 A | * 4/2000 | Faigle | 297/216.14 X |
| 6,123,393 A | * 9/2000 | Weller | 297/480 X |

FOREIGN PATENT DOCUMENTS

| DE | 2449436 | 4/1976 |
| DE | 19652665 | 5/1998 |
| EP | 0564962 | 10/1993 |
| JP | 52051624 | 4/1977 |

* cited by examiner

Primary Examiner—Laurie K. Cranmer
(74) Attorney, Agent, or Firm—Foley & Lardner

(57) ABSTRACT

The invention relates to a vehicle seat (1) in particular motor vehicle seat, comprising at least one base (2) and one back (3) which is at least inclinable relative to said base by pivoting round at least one pivot axis (4).

The seat is characterised in that it comprises a means of articulation or second means of articulation (6) which is located on one side of the seat (1), is normally freely movable and can be automatically locked by the direct or indirect action of at least one means (7) for detecting impacts or the consequences of an impact suffered by the vehicle under consideration.

7 Claims, 5 Drawing Sheets

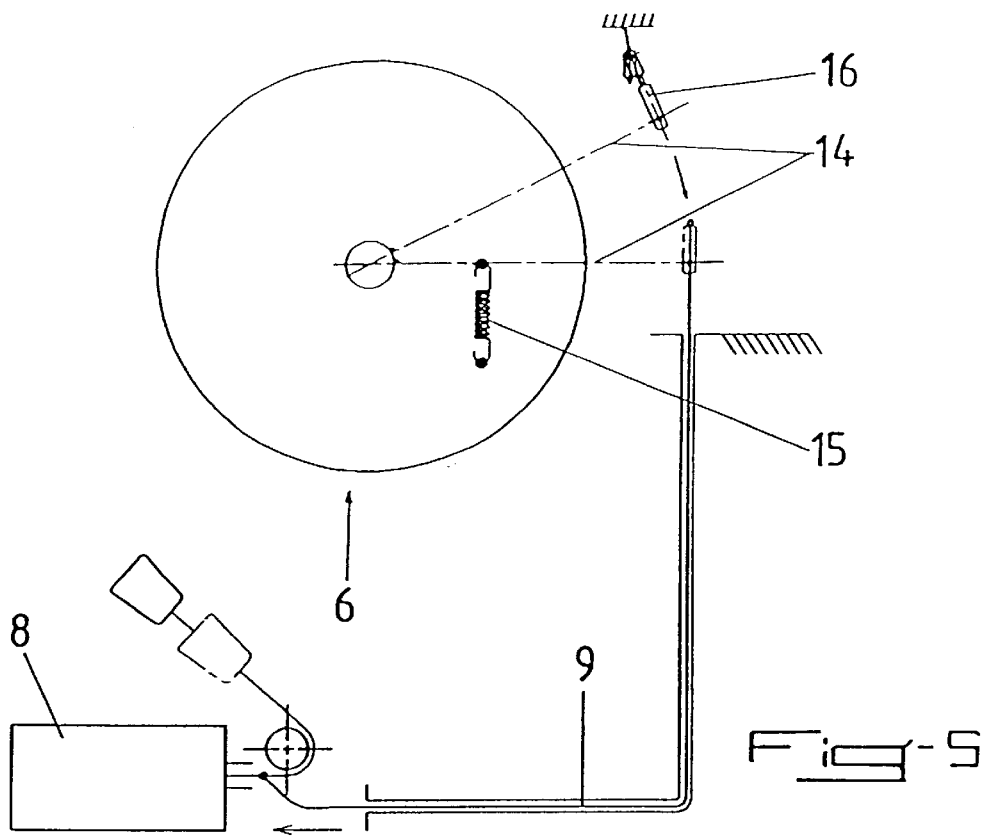
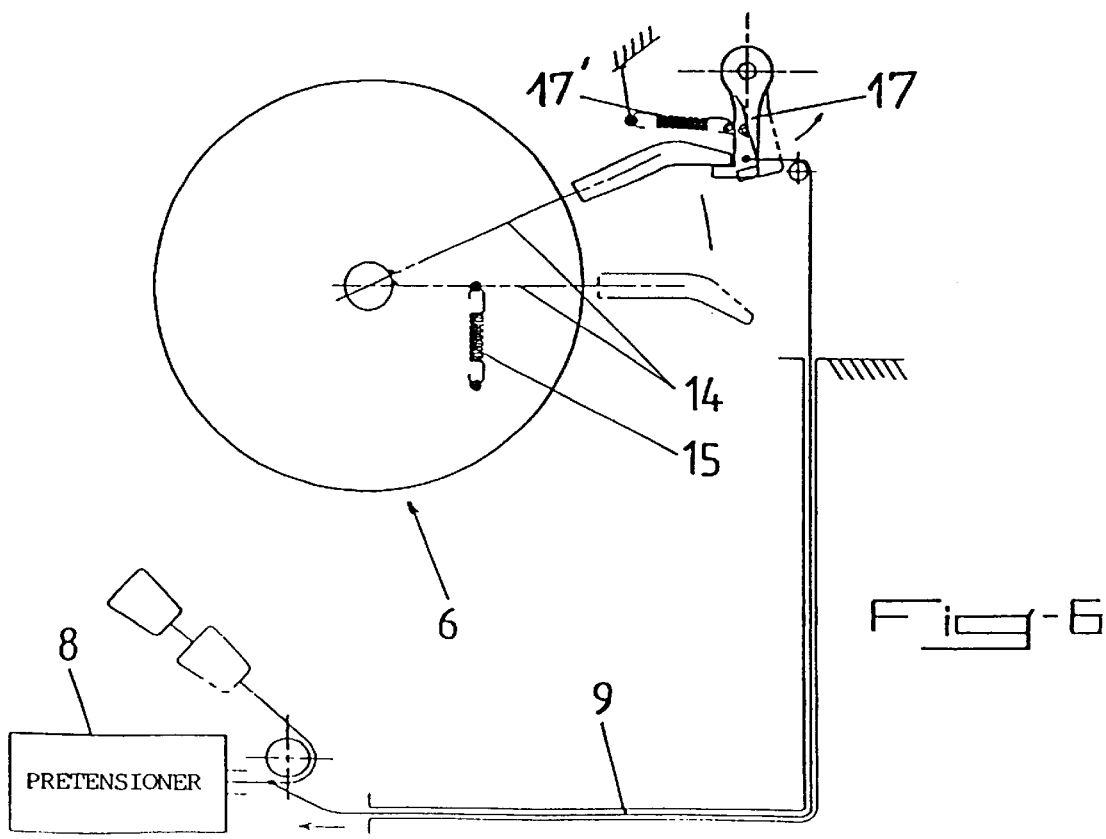

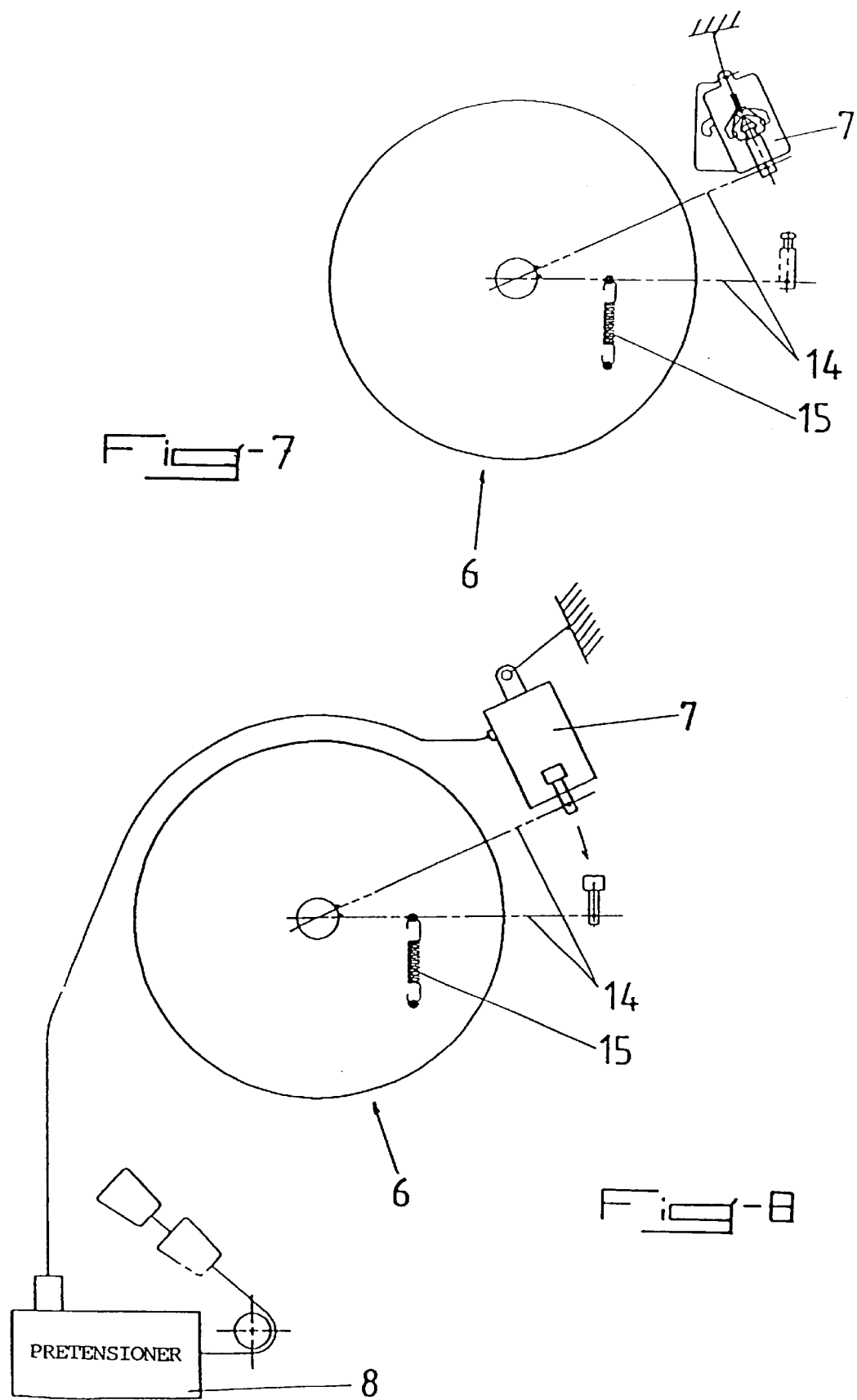

VEHICLE SEAT EQUIPPED WITH A DEVICE PROVIDING PROTECTION AGAINST IMPACTS FROM THE REAR

The present invention concerns the field of equipment, in particular equipment for motor vehicles or the like especially motor vehicle seats, and relates to a vehicle seat of this type equipped with a device providing protection, in particular, against impacts from the rear, and to a motor vehicle comprising at least one seat of this type.

At present, driver safety is of utmost importance in the production of new vehicles.

As structural elements and elements of comfort in direct contact with persons, the seats are essential to the safety of the occupants.

The seats, and in particular the seat backs, are markedly stressed especially in rear impact configurations and, if a single rotationally locked and latched lateral articulation is provided (standard equipment in numerous current motor vehicles), can lead to significant torsion in the frame of the back by the backward folding of the side remote from the articulation, which is likely to injure the occupants of said seats or even eject them.

Various solutions have already been proposed in an attempt to overcome this drawback and to increase the safety of the seats during an impact from the rear.

Thus, one of the solutions proposed involves reinforcing the structure of the frame of the back to increase its resistance to torsion.

However, to obtain at least minimal safety, this results in a significant increase in the cost and weight of the vehicle. Furthermore, the application of all the pressures received by the back in the region of a single articulation transforms this articulation into a very highly stressed element which is therefore susceptible to yield if its structure is not also reinforced, and this also involves a significant increase in its cost price.

It has also been proposed, to avoid reinforcing the back, to install two equivalent adjustable articulations on either side of the back to distribute the stresses better.

However, it is necessary precisely to synchronise the actuation and movement of these two articulations to avoid locking the back in position during adjustment or the twisting thereof, and therefore to provide additional expensive transmission mechanisms which have to be accommodated in the thickness of the seat and consequently increase its bulk.

Therefore, when continuously actuated articulations are used, it is necessary, for shifting the synchronisation rod outside the comfort zone of the back, to make use of complex, bulky and expensive transfer means (for example gears) owing to the necessary precision of fitting.

If discontinuous articulations are used, the transmission of movements from one to the other and the synchronisation thereof are achieved by means of a connecting rod, optionally shaped so as to leave the comfort zone of the back.

However, mere pressure in the region of the zone of the back comprising this rod can cause two articulations to unlatch and can therefore remove the hold for the back completely.

The object of the present invention is, in particular, to overcome the aforementioned drawbacks.

To this end, it relates to a vehicle seat, in particular motor vehicle seat, comprising at least one base and one back which is at least inclinable relative to said base by pivoting round at least one pivot axis, the seat being characterised in that it comprises a means of articulation or second means of articulation located on one side of the seat which is normally freely movable and can be automatically locked by the direct or indirect action of at least one means for detecting impacts or the consequences of an impact suffered by the vehicle under consideration.

The invention will be understood better by means of the following description which relates to preferred embodiments given as non-limiting examples and explained with reference to the accompanying schematic drawings.

FIGS. 4 to 8 are schematic views showing different variations of devices for triggering the locking of a means of articulation of the type shown in FIG. 3.

Figure 1:
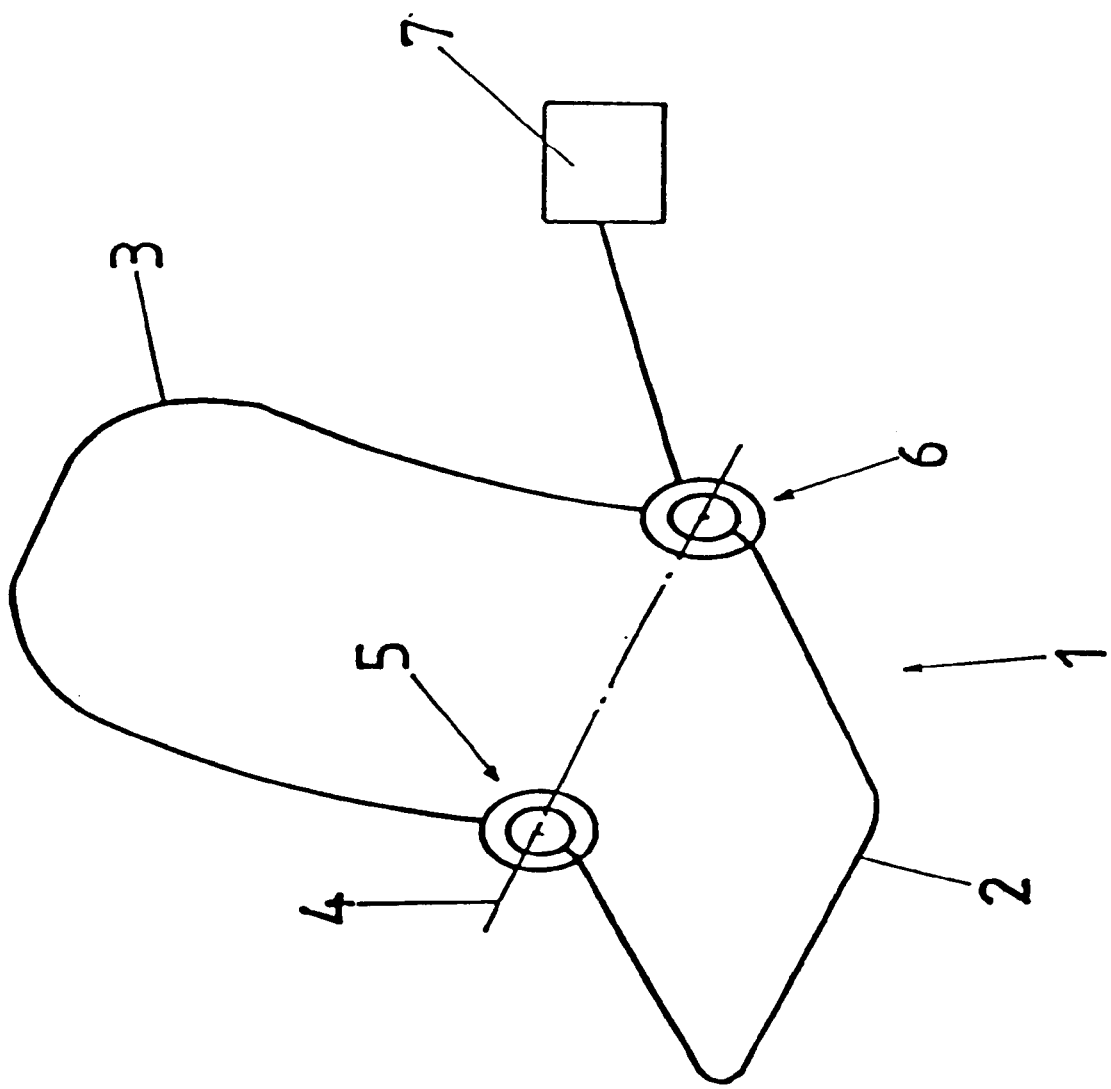
FIG. 1 is a schematic perspective view of a seat according to the invention.
Figure 2:
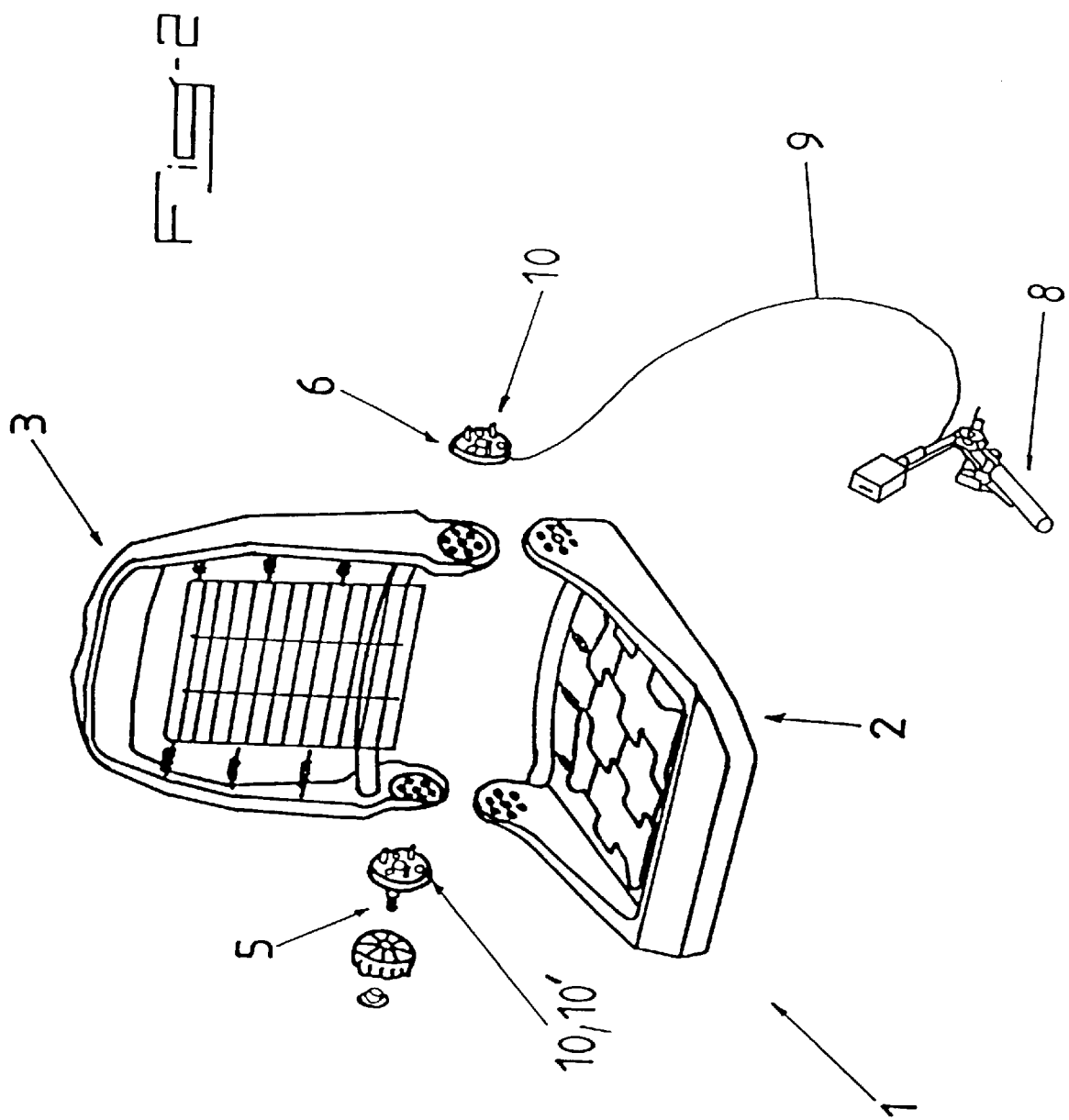
FIG. 2 is an exploded perspective view of the reinforcement of a seat according to a preferred variation of the invention.

As shown in particular in FIGS. 1 and 2 of the accompanying drawings, the vehicle seat 1, in particular the motor vehicle seat, comprises at least one base 2 and one back 3 which is at least inclinable relative to said base 2 by pivoting round at least one pivot axis 4.

According to the invention, said seat 1 also comprises a first means of articulation 6 or second means of articulation 6 located on one side of the seat 1 which is normally freely movable and can be automatically locked by the direct or indirect action of at least one means 7 for detecting impacts or the consequences of an impact suffered by the vehicle under consideration.

The invention can apply either to a front seat, in which case it cooperates with an existing or second means of articulation 5, or to a rear seat or bench portion, in which case it cooperates with a different means for connection of said seat or said bench in normal use.

In the case of a front seat 1 and in the case of a rear seat with a back 3 of adjustable inclination, said seat 1 comprises, more specifically, on the one hand, a second means of articulation 5 which is normally rotationally locked so as to hold the back 3 and allows the inclination of the back 3 relative to the base 2 to be adjusted after it has been unlatched and, on the other hand, a first means of articulation constituting the means of articulation 6 which is normally freely movable and is automatically locked, the two means of articulation being located on the two opposing sides of the seat 1.

The second means of articulation 5 is consequently used to adjust the position of the back 3 and merely holds it in position when the back 3 is subjected to slight stresses of the type occurring during normal use of the vehicle.

The first means of articulation 6, for its part, merely acts as a joint between the base 2 and the back 3 in normal time without obstructing the pivoting movement thereof.

In the event of high stresses in the region of the back 3, however, said first means of articulation 6 is locked and latches the back in position, said stresses being half taken up in the region of the two means of articulation 5 and 6 in the locked state.

According to a preferred embodiment of the invention, the first and second means of articulation 6 and 5 are aligned along the pivot axis 4 of the back 3 and are located symmetrically relative to the seat 1 while being independent of one another, the first means of articulation 6 consisting of a means of articulation which is kept under stress in the unlocked state so as to form a free pivot joint between the back 3 and the base 2 on the corresponding side of the seat 1.

To obtain a seat 1 having a symmetrical constitution and behaviour, the first and second means of articulation 6 and 5 can advantageously have rotational locking resistances of substantially identical values and, preferably, also identical structures.

In particular, the means of articulation 5 and 6 can have the form of a discontinuous articulation for a seat of the type known by the name of "camembert" and marketed, for example, by the company Bertrand Faure Automobiles.

The detection means 7 can be located either in the region of the automatically locked means of articulation 6 or at a distance therefrom and can be allocated, if applicable, to the triggering of a further means of active protection or safety for one or more occupants of the vehicle concerned.

The triggering of the locking or latching of the automatically locked means of articulation 6 can be controlled as a function of collected information relating to the state of the vehicle or certain parts of the vehicle concerned.

According to a first variation of the invention, the detection means 7 capable of triggering the locking of the automatically locked means of articulation 6 consists of an impact detector which triggers either the inflation of at least one inflatable safety cushion or the tensioning of at least one seat belt or again the activation of a similar means of passive protection or safety.

According to a second variation of the invention, the detection means 7 capable of triggering the rotational locking of the automatically locked means of articulation 6 is connected to at least one sensor measuring the deformation of the rear bumper or of a similar deformable element in the event of an impact from the rear.

According to a third variation of the invention, the detection means 7 consists of a means for monitoring the angle of inclination of the seat back 1 under consideration, triggering the locking of the automatically locked means of articulation 6 when the angle of inclination of the back 3 of the seat 1 backwards exceeds a predetermined value, for example 30° to 50°, preferably 40°, relative to the vertical.

According to a fourth variation of the invention, the detection means 7 consists of a means for monitoring the speed of rotation or pivoting of the back 3 round the pivot axis 4 measured in the region of the automatically locked means of articulation 6 or of a point of the back 3 remote from said automatically locked means of articulation 6, locking of the automatically locked means of articulation 6 being triggered when said speed of linear or angular travel exceeds a determined limit value.

On this point, care should be taken to ensure that the limit value is not too high to allow reliable locking of the back 3 nor too low to prevent untimely triggering of said locking if the position of the back 3 is adjusted.

According to a fifth variation of the invention, the detection means 7 capable of triggering the locking of the automatically locked means of articulation 6 comprises at least one sensor intended to detect any significant deformation of the frame of the back 3 of the seat 1 under consideration, in particular any torsion or twisting thereof, higher than a determined threshold value.

In the aforementioned five variations, the latching of the automatically locked means of articulation 6, that is its conformity with the normal state (rotationally locked) of a second means of articulation 5 or a further means for connecting or holding the seat 3, is achieved after reception of a trigger signal delivered by a detection means 7, said signal actuating, after a time delay if necessary, an actuator such as an electromagnet acting on a latch or retention element which is capable of eliminating the stress holding the means of articulation 6 in the unlocked state or of acting positively on it to bring it into the locked state.

However, it is also possible, in order to avoid the use of a detection means 7 and an additional actuator, directly to use the reaction to an impact of a safety device already present in the vehicle to allow the locking of said means of articulation 6.

To this end, the rotational locking of the automatically locked means of articulation 6 can be triggered directly by the triggering device 8 of a means for the passive protection or safety of one or more occupants of the vehicle, reacting in the event of an impact, such as a seat belt pretensioner.

As shown by way of example in FIG. 2 of the accompanying drawings, the movement of the moving element of the pretensioner 8 is therefore directly transmitted by means of a synchronising mechanical cable 9 (for example a cable of the Bowden type) to the element for holding the means of articulation 6 (latch, hook, . . . ) in the unlocked state.

Figure 3:
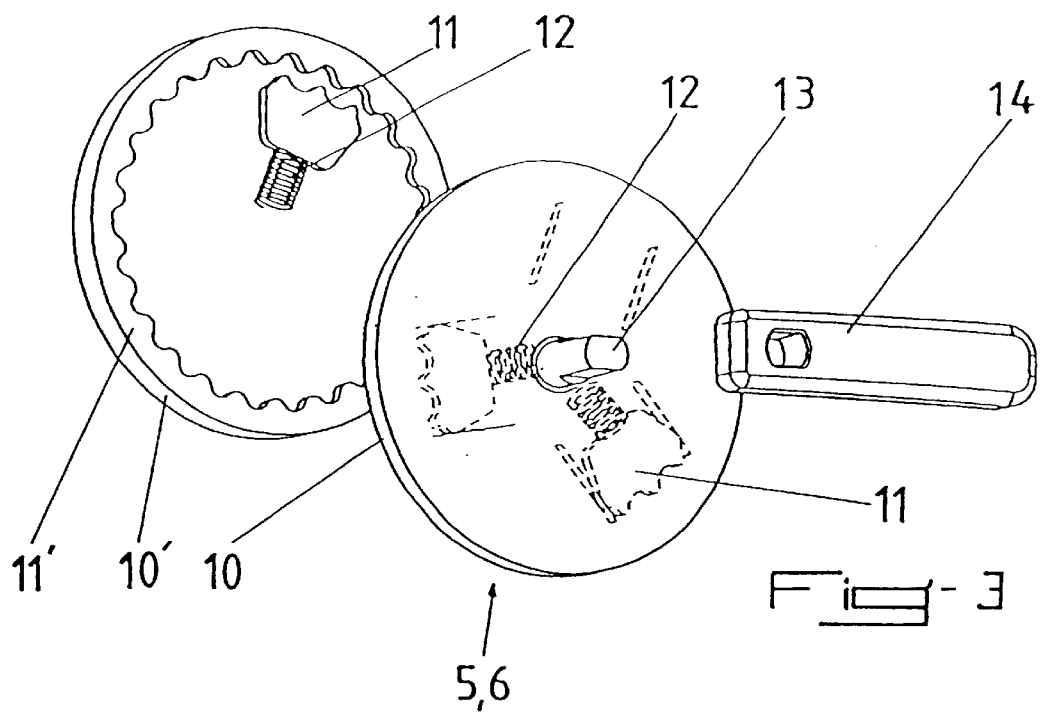
FIG. 3 is an exploded view on a different scale of an embodiment of a means of articulation of the so-called "camembert" type.

As shown more specifically in FIGS. 2 and 3 of the accompanying drawings, an articulation of the aforementioned "camembert" type consists mainly of two cheeks 10 and 10' mounted with the ability to rotate relative to one another and of which one is connected to the back 3 and the other to a fixed part of the base of the seat 1 so as to allow said back 3 to be folded down in the unlatched state.

The two cheeks 10 and 10' are locked angularly relative to one another by several toothed lugs or pellets 11 sliding radially in the guide rails of one cheek 10 and meshing in the indentations of matching shape in an internal crown 11' of the other cheek 10'.

Each lug or pellet 11 is elastically stressed in the triggered position by the action of a corresponding restoring spring 12.

The lugs or pellets 11 can be disengaged and held in the disengaged state by a retraction and retention member 13 which can be actuated by a control member 14 such as a lever.

As a function of the position of the control, such an articulation 5, 6 can consequently either permit relative rotation of the two cheeks 10, 10' or allow rigid rotational connection thereof, the return springs 12 automatically stressing the articulation 5, 6 in the latched position by engagement of the lugs 11 in the crown 11'.

As non-limiting embodiments of the invention relating to an articulation 6 of the aforementioned type, several variations of the device for triggering said articulation 6 in order to lock it will be described hereinafter (FIGS. 4 to 7).

In all these embodiments, the control lever 14 controlling the state of the articulation 6 is constantly stressed by a spring 15 toward a position corresponding to the locking of said articulation 6.

Figure 4:
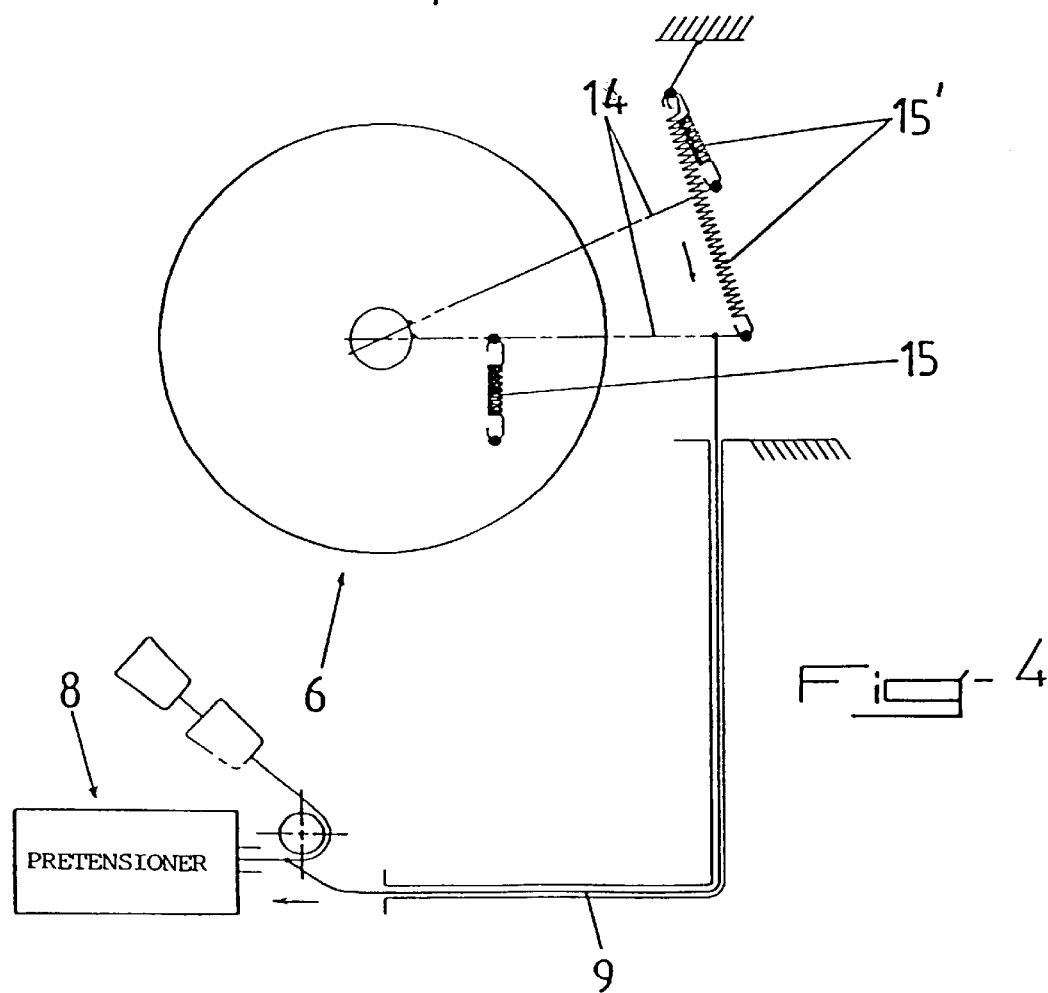

In the embodiment shown in FIG. 4, the means of articulation 6 is held normally in the unlatched position by a spring 15' exerting a torque on the control lever 14 opposed to that exerted by the spring 15 and having a higher value than it.

A control cable 9 produces the connection to the cable of the pretensioner 8 and allows locking of the means of articulation 6 to be triggered.

In fact, during an impact, the pretensioner 8 retracts to tension the corresponding seat belt and the displacement thus created actuates the control cable 9 which therefore exerts a torque on the lever 14 much higher than the torque for holding it in the unlatched position provided by the spring 15', thus causing the locking or latching of the articulation means 6.

In the embodiment shown in FIG. 5, the control lever 14 of the means of articulation 6 is held in the unlatched position by a calibrated cleavable tie rod 16.

During an impact, the triggering of the pretensioner 8 applies a tensile load to the control cable 9 which is sufficient to break the tie rod 16 and therefore lock the means of articulation 6.

In the embodiment shown in FIG. 6, the control lever 14 of the means of articulation 6 is held in the unlatched position by a hook 17 returned by a holding spring 17' and engaging the free end of said control lever 14.

This hook 17, like a cocking rod, is actuable by the control cable 9 connected to the pretensioner 8.

A tension exerted on the cable 9 causes retraction of the hook 17, frees the control lever 14 and results in latching of the means of articulation 6.

In the embodiment shown in FIG. 7, the control lever 14 of the means of articulation 6 is held in the unlatched position by a mechanical device 7 sensitive to deceleration.

Deceleration greater than a threshold value will cause the liberation of the control lever 14 and consequently the latching of the means of articulation 6.

In the embodiment shown in FIG. 8, the control lever 14 of the means of articulation 6 is held in the unlatched position by a non-activated electrical or pyrotechnical triggering device 7.

Deceleration of the vehicle detected by the electrical system thereof and higher than a predetermined threshold value will cause the generation of an activating electrical pulse delivered simultaneously to the pretensioner 8 and to the triggering device 7, the triggering device 7 thus freeing the control lever 14 and therefore causing the means of articulation 6 to lock.

The present invention also relates to a motor vehicle comprising at least one, preferably several, front or rear seats comprising an automatically locked, normally freely rotatable means of articulation 6, as described above.

The invention is obviously not limited to the embodiments described and illustrated in the accompanying drawings. Modifications are possible, in particular with regard to the constitution of the various elements or by substitution of technical equivalents, without departing from the scope of protection of the invention.

I claim:

1. A vehicle seat comprising at least one base and one back which is inclinable relative to the base by pivoting about at least one pivot axis, a means of articulation located on one side of the seat which is normally freely movable and can be automatically locked by the direct or indirect action of an impact detector which triggers either the inflation of at least one inflatable safety cushion or the tensioning of at least one seat belt.

2. A vehicle seat comprising at least one base and one back which is inclinable relative to the base by pivoting about at least one pivot axis, a means of articulation located on one side of the seat which is normally freely movable and can be automatically locked by the direct or indirect action of at least one sensor measuring the deformation of a rear bumper or a similar deformable element in the event of an impact to the rear bumper.

3. A vehicle seat comprising at least one base and one back which is inclinable relative to the base by pivoting about at least one pivot axis, a means of articulation located on one side of the seat which is normally freely movable and can be automatically locked by the direct or indirect action of a means for monitoring the angle of inclination of the back of the seat and triggering the locking of the means of articulation when the backwards angle of inclination of the back of the seat exceeds an angle in the range of 30° to 50° relative to the vertical.

4. The vehicle seat of claim 3, wherein the backwards angle of inclination of the back of the seat exceeds an angle in the range of 35° to 45° relative to vertical.

5. A vehicle seat comprising at least one base and one back which is inclinable relative to the base by pivoting about at least one pivot axis, a means of articulation located on one side of the seat which is normally freely movable and can be automatically locked by the direct or indirect action of a means for monitoring the speed of rotation or pivoting of the back about the pivot axis measured in the region of the means of articulation, whereby locking of the means of articulation is triggered when said speed of linear or angular travel exceeds a pre-determined limit value.

6. A vehicle seat comprising at least one base and one back which is inclinable relative to the base by pivoting about at least one pivot axis, a means of articulation located on one side of the seat which is normally freely movable and can be automatically locked by the direct or indirect action of at least one sensor intended to detect any significant deformation of the frame of the back of the seat, and in particular any torsion or twisting thereof.

7. A vehicle seat comprising at least one base and one back which is inclinable relative to the base by pivoting about at least one pivot axis, a means of articulation located on one side of the seat which is normally freely movable and can be automatically locked directly by a means for passive protection or safety of one or more occupants, reacting in the event of an impact, such as a seat belt pretensioner.

* * * * *